United States Patent
Won et al.

(10) Patent No.: US 10,500,921 B2
(45) Date of Patent: Dec. 10, 2019

(54) ELECTRIC HEATER APPARATUS FOR ELECTRIC VEHICLE AND METHOD OF CONTROLLING SAME

(75) Inventors: Seungsik Won, Daejeon-si (KR); Jungki Lee, Daejeon-si (KR); Jungwon Cho, Daejeon-si (KR); Youngkee Baek, Daejeon-si (KR)

(73) Assignee: Hanon Systems, Daejeon (KR)

( * ) Notice: Subject to any disclaimer, the term of this patent is extended or adjusted under 35 U.S.C. 154(b) by 1494 days.

(21) Appl. No.: 13/571,681

(22) Filed: Aug. 10, 2012

(65) Prior Publication Data
US 2013/0043231 A1 Feb. 21, 2013

(30) Foreign Application Priority Data

Aug. 16, 2011 (KR) .................. 10-2011-0081036
Jul. 27, 2012 (KR) .................. 10-2012-0082179

(51) Int. Cl.
*B60L 1/02* (2006.01)
*B60H 1/22* (2006.01)
*H05B 1/02* (2006.01)

(52) U.S. Cl.
CPC ......... *B60H 1/2218* (2013.01); *H05B 1/0236* (2013.01); *B60H 2001/2265* (2013.01); *H05B 2203/02* (2013.01); *H05B 2203/023* (2013.01)

(58) Field of Classification Search
CPC .... B60H 1/2225; B60H 1/00428; H05B 3/84; B62D 1/065; F02M 1/00; A45D 4/06; F24C 7/08
USPC ....... 219/202, 203, 204, 205, 206, 483, 485, 219/486, 497, 507, 508, 480
See application file for complete search history.

(56) References Cited

U.S. PATENT DOCUMENTS

| | | | | |
|---|---|---|---|---|
| 4,593,180 A | * | 6/1986 | Narita | A47J 27/62 219/492 |
| 5,908,571 A | * | 6/1999 | Scott | H05B 3/74 219/457.1 |
| 6,559,426 B2 | | 5/2003 | Jirmann | |
| 6,675,873 B2 | * | 1/2004 | Ieda | B60H 1/00428 165/43 |
| 7,154,068 B2 | * | 12/2006 | Zhu | B60L 3/0046 219/202 |

(Continued)

FOREIGN PATENT DOCUMENTS

| | | |
|---|---|---|
| DE | 10 109 734 A1 | 9/2002 |
| EP | 1 026 020 A1 | 8/2000 |

(Continued)

*Primary Examiner* — Jimmy Chou
(74) *Attorney, Agent, or Firm* — Norton Rose Fulbright US LLP (57) ABSTRACT

The present invention relates to an electric heater apparatus including a switch control part for controlling a switching part according to a control command of an air-conditioner controlling part; the switching part switched according to a switching control signal of the switch control part for supplying electric power of the power supply part from a heating part; and the heating part for receiving the electric power of the switching part and generating heat, wherein the switching part includes a plurality of switching modules set to control an output load of the heating part, and the switch control part operates one or more switching modules in serial order according to a target heating temperature.

3 Claims, 6 Drawing Sheets

(56) References Cited

U.S. PATENT DOCUMENTS

| | | | |
|---|---|---|---|
| 7,189,942 B2* | 3/2007 | Kotani | B60L 3/0046 |
| | | | 219/202 |
| 7,287,581 B2* | 10/2007 | Ziehr | B60H 1/00392 |
| | | | 165/202 |
| 8,314,364 B2* | 11/2012 | Brust | B60H 1/2218 |
| | | | 219/205 |
| 8,931,547 B2* | 1/2015 | Yen | B60H 1/00392 |
| | | | 165/202 |
| 2002/0167227 A1 | 11/2002 | Matsunaga et al. | |
| 2003/0127448 A1* | 7/2003 | Jirmann | B60H 1/00428 |
| | | | 219/480 |
| 2003/0178409 A1* | 9/2003 | Kempf | B25F 5/02 |
| | | | 219/494 |
| 2003/0183619 A1* | 10/2003 | Bohlender | B60H 1/00978 |
| | | | 219/494 |
| 2003/0217559 A1* | 11/2003 | Ieda | B60H 1/00428 |
| | | | 62/230 |
| 2004/0144769 A1* | 7/2004 | Pastore | H05B 3/746 |
| | | | 219/447.1 |
| 2006/0016793 A1* | 1/2006 | Zhu | H01M 10/615 |
| | | | 219/205 |
| 2010/0084115 A1 | 4/2010 | Sung | |
| 2010/0264128 A1* | 10/2010 | Cooper | A23B 4/052 |
| | | | 219/507 |
| 2011/0105003 A1* | 5/2011 | Park | B60H 1/00392 |
| | | | 454/75 |
| 2011/0127246 A1* | 6/2011 | Heiden | B60L 1/02 |
| | | | 219/202 |
| 2011/0233189 A1* | 9/2011 | Reiss | B60H 1/2218 |
| | | | 219/492 |
| 2012/0279951 A1* | 11/2012 | Xu | H01M 10/443 |
| | | | 219/202 |

FOREIGN PATENT DOCUMENTS

| | | |
|---|---|---|
| EP | 2 371 589 A1 | 10/2011 |
| JP | 02-301983 | 12/1990 |
| JP | 05-169967 | 7/1993 |
| JP | 4465913 B2 | 5/2010 |
| KR | 10-2010-0041254 A | 4/2010 |
| KR | 2010-0038571 A | 4/2010 |

* cited by examiner

Prior art

Present invention

ELECTRIC HEATER APPARATUS FOR ELECTRIC VEHICLE AND METHOD OF CONTROLLING SAME

This application claims priority under 35 U.S.C. § 119 from Korean Patent Application No. 10-2011-0081036 filed Aug. 16, 2011 and Korean Patent Application No. 10-2012-0082179 filed Jul. 27, 2012, each of which is incorporated herein by reference in its entirety for all purposes.

BACKROUND OF THE INVENTION

Field of the Invention

The present invention relates to an electric heater apparatus for an electric vehicle and a method of controlling the same, and more particularly, to an electric heater apparatus for an electric vehicle and a method of controlling the same, which can expand a temperature control width by a duty ratio (hereinafter, called 'duty') when operation of a PTC heater (Positive Temperature Coefficient heater) is controlled, and provide a uniform distribution of temperature increment.

Background Art

In general, a conventional heating system for a vehicle heats the inside of the vehicle through the steps of making a heat exchange medium (engine coolant) in a flow passage and raising the temperature of air by exchanging heat between the air supplied to the inside of the vehicle and the heat exchange medium when the engine coolant passes a heat exchanger.

Recently, pollution-free electric vehicles, which do not use oil not to cause pollution, have been developed. However measures to heat the inside of the vehicles are urgently needed because the electric vehicle, which is operated only by a motor, is markedly lower in heat value of the coolant for cooling the motor than general vehicles or hybrid vehicles using a combustion engine.

Accordingly, lots of technologies of sending temperature suitable for a driver's demand on heating and cooling to the inside of the vehicle by having a PTC heater (Positive Temperature Coefficient heater), hereinafter called 'PTC heater', at the rear of an evaporator without using a temperature-adjusting door have been disclosed, and as an example, there is Korean Patent Laid-open No. 2010-0038571.

Such a conventional FTC heater for an electric vehicle performs heating using electricity of a battery and controls temperature by changing voltage applied to the PTC heater (which is called 'PWM (Pulse Width Modulation)'.

Figure 1:
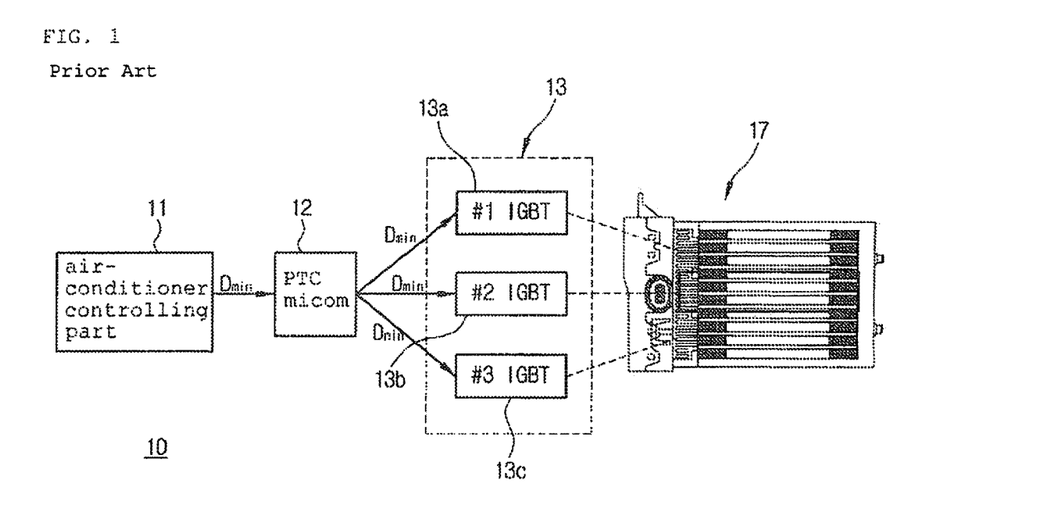
FIG. 1 is a circuit diagram showing a schematic configuration of a PTC heater apparatus of a PWM method applied to an electric vehicle according to a prior art.

FIG. 1 is a circuit diagram showing a schematic configuration of a PTC heater apparatus 10 of a PWM method applied to an electric vehicle according to a prior art.

As shown in FIG. 1, the PTC heater apparatus 10 for the electric vehicle according to the prior art includes: an air-conditioner controlling part 11 for controlling heating, cooling and blowing inside the electric vehicle; a PTC micom 12 for controlling a high-voltage switching part 13, which supplies electricity of a battery part (not shown) to a PTC heater 17 after being switched according to a switching control command of the PTC micom 12; and the PTC heater 17, which carries out a fixed temperature heat.

The switching part 13 in the PTC heater apparatus 10 according to the prior art includes an IGBT (Insulated Gate Bipolar mode Transistor), which is a high voltage switching element, and a plurality of IGBTs are applied according to the maximum output load by an allowable limit of current consumption of the IGBT. FIG. 1 illustrates an example that three 2 kW IGBTs are divided into first to third switching modules 13a to 13c to form a PTC heater of the maximum 6 kW.

Figure 2:
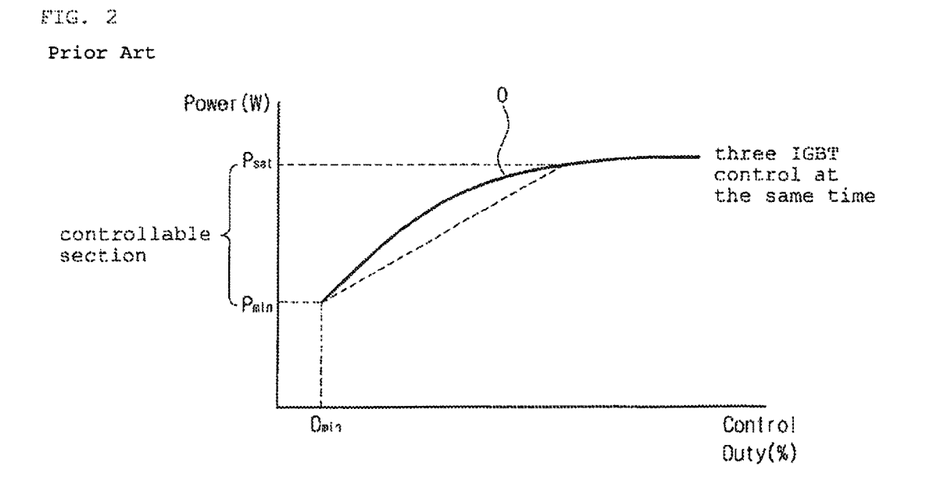
FIG. 2 is a graph showing a duty control for controlling temperature in the PTC heater apparatus according to the prior art.

FIG. 2 is a graph showing a duty control for controlling temperature in the PTC heater apparatus according to the prior art.

As shown in FIG. 2, in the PTC heater apparatus 10 according to the prior art, the same input signal is applied to all IGBTs for a uniform temperature distribution. However, it has a problem in that just one duty control section is formed because the plural IGBTs are controlled at the same time, and hence, the heat value is high in a low duty and a controllable section becomes small. In FIG. 1, the reference numeral '0' designates a heat value of the PTC heater 17 corresponding to one duty control section or a conventional PTC-applied electric power applied to the PTC heater 17.

That is, because the same input signal is applied to three IGBTs at the same time, it causes three time heat at the minimum duty, and hence, a control width at low temperature is reduced. So, a width of the minimum heat value becomes small, and hence, in the case that heat for temperature lower than the minimum heat value Is needed, a cycling of repeatedly carrying out ON/OFF actions at the minimum control temperature is frequently generated and it increases power consumption. The reason of an increase of power consumption is that a large current flows by a low resistance when the PTC heater is operated at the minimum temperature.

Figure 3:
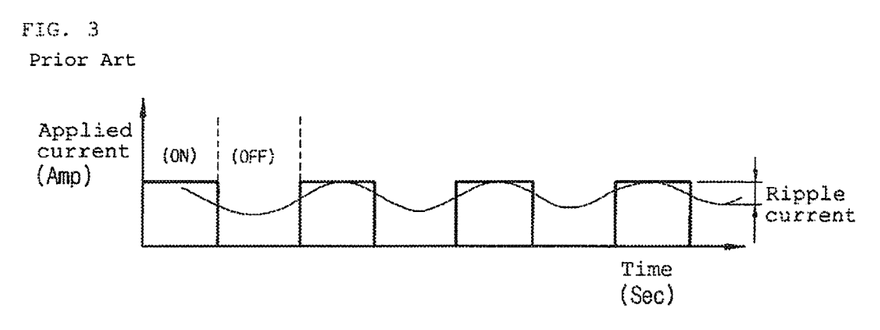
FIG. 3 is a graph showing ripple current of one IGBT (Insulated Gate Bipolar mode Transistor)
Figure 4:
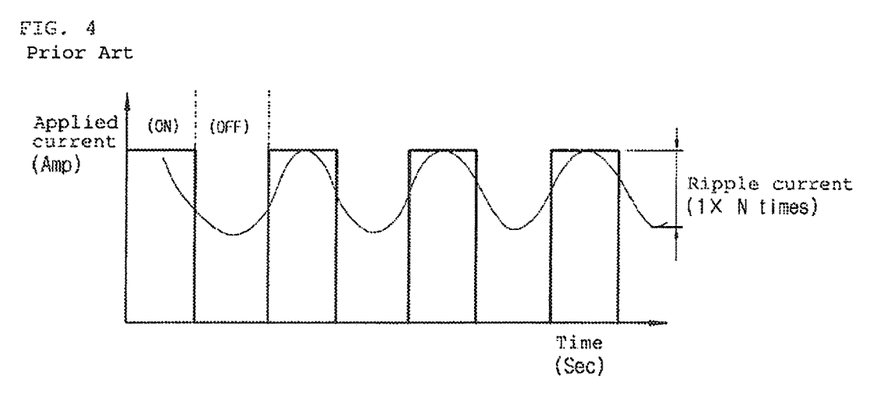
FIG. 4 is a graph showing ripple current when IGBTs of an n-tuple.

FIG. 3 is a graph showing ripple current of one IGBT, and FIG. 4 is a graph showing ripple current when IGBTs of an n-tuple. As shown in FIGS. 3 and 4, the ripple current of one IGBT is small, but when the IGBTs of the n-tuple are controlled at the same time as in the prior art, ripple current becomes N times, such that the lifespan of the battery is deteriorated.

SUMMARY OF THE INVENTION

Accordingly, the present invention has been made to solve the above-mentioned problems occurring in the prior arts, and it is an object of the present invention to provide an electric heater apparatus applied to an electric vehicle, which can expand a range of a low temperature area by expanding a temperature control width of the PTC heater and minimize a cycling of the PTC heater in control for a low temperature, and a method of controlling the electric heater apparatus.

To accomplish the above object, according to the present invention, there is provided an electric heater apparatus for an electric vehicle including: a power supply part mounted in the electric vehicle; a switch control part for controlling a switching part according to a control command of an air-conditioner controlling part; the switching part switched according to a switching control signal of the switch control part for supplying electric power of the power supply part from a heating part; and the heating part for receiving the electric power of the switching part and generating heat, wherein the switching part includes a plurality of switching modules set to control an output load of the heating part, and the switch control part operates one or more switching modules in serial order according to a target heating temperature.

The switching modules are IGBTs (Insulated Gate Bipolar mode Transistors) which are high-voltage switching elements, and the switch control part divides a temperature control section of the heating part according to the number of the IGBTs. The switch control part carries out a duty control of one IGBT in the case that temperature control is carried out by electric current which does not exceed the maximum allowable current capacity of one IGBT, and carries out the duty control of one IGBT and controls other IGBTs to maintain a full-on operation state in the case that the temperature control is carried out by electric current which is in an allowable current capacity range of two or more IGBTs.

The switch control part turns off the IGBT which is in the duty control and carries out the duty control of one of the IGBTs which are in the full-on operation state so as to reduce the temperature, in the case that the IGBT which is in the duty control reaches the minimum duty control value of the IGBT during a temperature decrease control.

The switch control part controls ON/OFF modes of the switching part by applying a PWM (Pulse Width Modulation) control signal to a gate terminal of the IGBT.

The heating part is a PTC heater having fixed temperature heating characteristics.

The power supply part is a high-voltage battery for operating the electric vehicle.

In another aspect of the present invention, there is a method of controlling an electric heater apparatus for an electric vehicle, which includes a switching part having a plurality of switching modules and duty control sections of a PTC heater which are divided corresponding to the number of the switching modules in order to control a heat generation of the PTC heater, including: an initial duty control process (S30) of carrying out a duty control of one IGBT in the case that a temperature control is carried out by electric current which does not exceed the maximum allowable current capacity of one IGBT; and a full-on duty control process (S40) carrying out the duty control of one switching module and controlling other switching modules to be in a full-on state in order to output electric power corresponding to the width of the duty control section, in the case that the electricity capacity is the sum of electricity amounts for duty control in the plural duty control sections during the duty control.

In the initial duty control process (S30), during the initial operation, in the case that the preset temperature exceeds the allowable current consumption value of one of the switching modules, a plurality of the switching modules are operated to have current consumption necessary for the preset temperature, and in this instance, one of the switching modules is in the duty control and other switching modules are controlled in the full-on state.

The full-on duty control process (S40) includes a temperature increase full-on duty control process (S60) of controlling the switching module for the duty control in the full-on operation state and turning on another switching module and carrying out the duty control of the newly turned-on switching module, in the case that a set temperature exceeds the sum of allowable current values of the plural switching modules.

The full-on duty control process (S40) further includes temperature decrease full-on duty control process (S70) of turning off the switching module which is in control by duty and carrying out the duty control of one of the switching modules which are operated in the full-on state and controlling other switching modules in the full-on state, in the case that the switching modules which are in control by duty reach the state where they are controlled by the minimum duty control value in the corresponding section, and repeatedly carrying out the above process.

The controlling method of the electric heater apparatus further includes a duty control determining process (S20) of calculating a current value of the preset temperature of the PTC heater at the initial stage, determining whether or not the calculated current value exceeds the maximum allowable current value of one switching module, and carrying out a full-on duty control process (S40) in the case that the current value exceeds the maximum allowable current value or carrying out an initial duty control process (S30) in the case that the current value does not exceed the maximum allowable current value.

Accordingly, the electric heater apparatus and the controlling method of the electric heater apparatus according to the present invention can expand the width of the inside temperature control section and lower the minimum temperature control range by dividing the temperature control section, which is the duty control section, according to the number of the switching modules, carrying out the duty control in each of the divided duty control sections and controlling the switching modules in the full-on state corresponding to each of the duty control sections controlled in the full-on state.

Moreover, the present invention can enhance comfort in the indoor environment by carrying out heating by lowering the minimum temperature for heating.

Furthermore, because the present invention expands the width of the temperature control section and accurately controls temperature by carrying out the duty control of only one switching module corresponding to each of the duty control sections (temperature control sections) divided according to the number of the switching modules, in order to control temperature.

Additionally, the present invention can reduce unnecessary cycling at low temperature and unnecessary power consumption by reducing the minimum heat value.

In addition, the present invention can reduce a ripple current by controlling the plural IGBTs in serial order to thereby increase the lifespan of the high-voltage battery.

BRIEF DESCRIPTION OF THE DRAWINGS

The above and other objects, features and advantages of the present invention will be apparent from the following detailed description of the preferred embodiment of the invention in conjunction with the accompanying drawings, in which.

FUG. 8 is a view showing a state where a high-voltage battery (power supply part) supplies electricity to the PTC heater.

DETAILED DESCRIPTION OF THE PREFERRED EMBODIMENT

Description will now be made in detail of preferred embodiment of the present invention with reference to the attached drawings.

Figure 5:
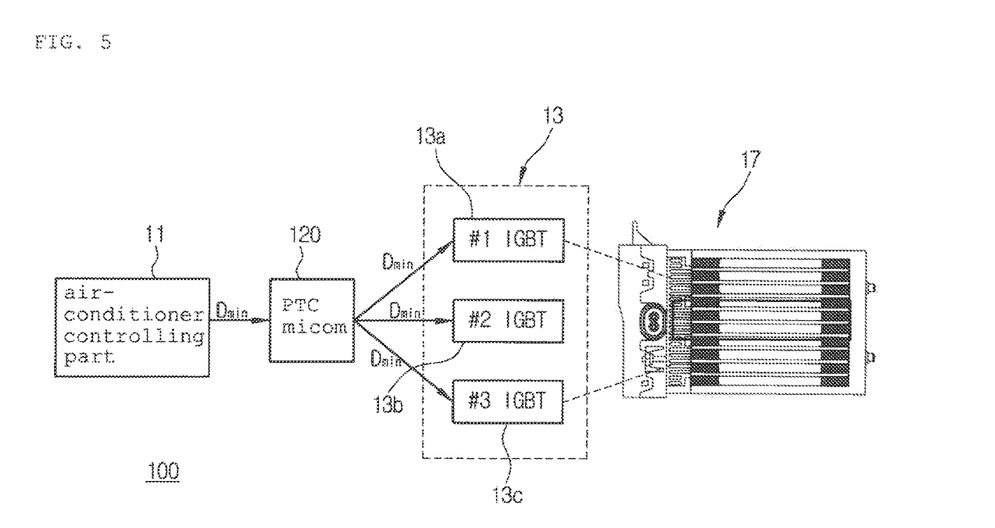
FIG. 5 is a schematic diagram of a PTC heater apparatus of an electric heater apparatus for an electric vehicle according to the present invention.
Figure 6:
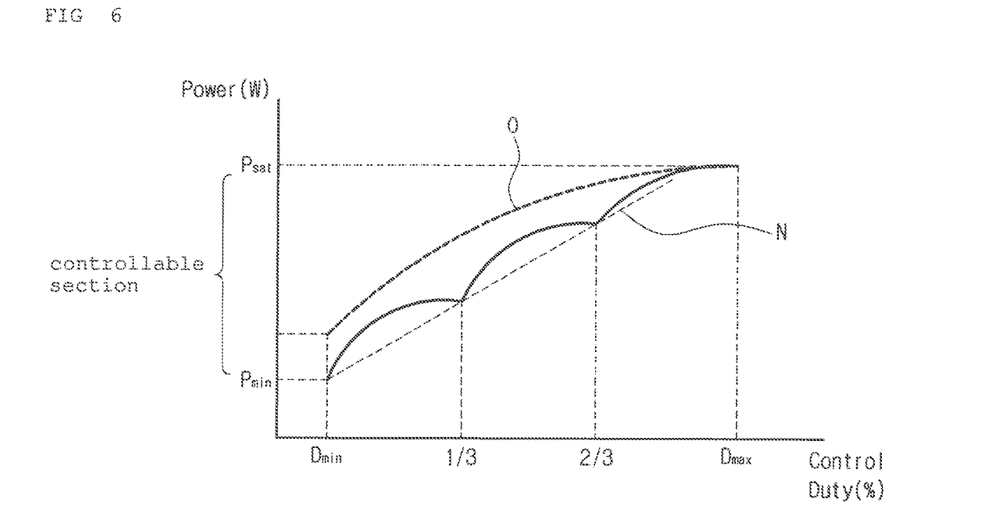
FIG. 6 is a graph showing a duty control for controlling temperature in the PTC heater apparatus of FIG. 5 by a divided duty control section.

FIG. 5 is a schematic diagram of a PTC (Positive Temperature Coefficient heater) heater apparatus 100 of an electric heater apparatus for an electric vehicle according to the present invention, and FIG. 6 is a graph showing a duty control for controlling temperature in the PTC heater apparatus 100 of FIG. 5 by a divided duty control section.

In FIG. 5, components serving the same functions as the components of FIG. 1 have the same reference numerals as FIG. 1.

As shown in FIG. 5, the PTC heater apparatus 100 includes: a power supply part, (not shown) mounted in the electric vehicle; an air-conditioner controlling part 11 for controlling heating, cooling and air-blowing inside the electric vehicle; a PTC mi com 120 for controlling duty control sections of a high-voltage switching part 13, which supplies electric power to the PTC heater 17 and is divided into the number of switching modules 13a to 13c of a switching part 13, according to a heating control command of the air-conditioner controlling part 11; the switching part 13 switched according to the switching control command of the PTC micom 12 for supplying electric power of the power supply part to the PTC heater 17; and the PTC heater 17 for providing a fixed temperature heat by electric power supplied by switching of the switching part 13.

The switching part 13 in the PTC heater apparatus 100 of the prior art includes a plurality of IGBTs (Insulated Gate Bipolar mode Transistors), which are high-voltage switching elements and are applied according to the maximum output load by an allowable limit of current consumption of the IGBTs. In FIG. 5, like FIG. 1, three 2 kW IGBTs respectively form the first to third switching modules 13a to 13c in order to operate the maximum 6 kW PTC heater.

In an embodiment of the switch controlling part, the PTC micom 120 is constructed to control output power by applying a PWM (Pulse Width Modulation) control signal to gate terminals of the IGBTs, which are the switching modules 13a to 13c of the switching part 13. Moreover, the PTC micom 120 divides the entire duty control section into the number of the IGBTs of the switching modules 13a to 13c and carries out the duty control. In the above process, in the case that temperature is controllable through the duty control of one switching module 13a, 13b or 13c according to a target heating temperature of the PTC heater 17, the PTC micom 120 carries out temperature control by carrying out the duty control of one switching module 13a, 13b or 13c. During the temperature control, in the case that the heat value of the PTC heater 17 exceeds the duty control range of the one switching module, the switching modules 13a to 13c (the switching modules driving now) which are in the duty control are in a full-on state, and then, a new one (the switching module which is not operated) is turned on and is in duty control. In this instance, in the case that a temperature control range requires allowable current values of the plural switching modules (selected plural switching modules out of the switching modules 13a to 13c), the plural switching modules 13a to 13c are turned on. Additionally, other switching modules excepting the one switching module are operated in the full-on state and the one switching modules in duty control in order to control temperature within the corresponding temperature range.

Figure 7:
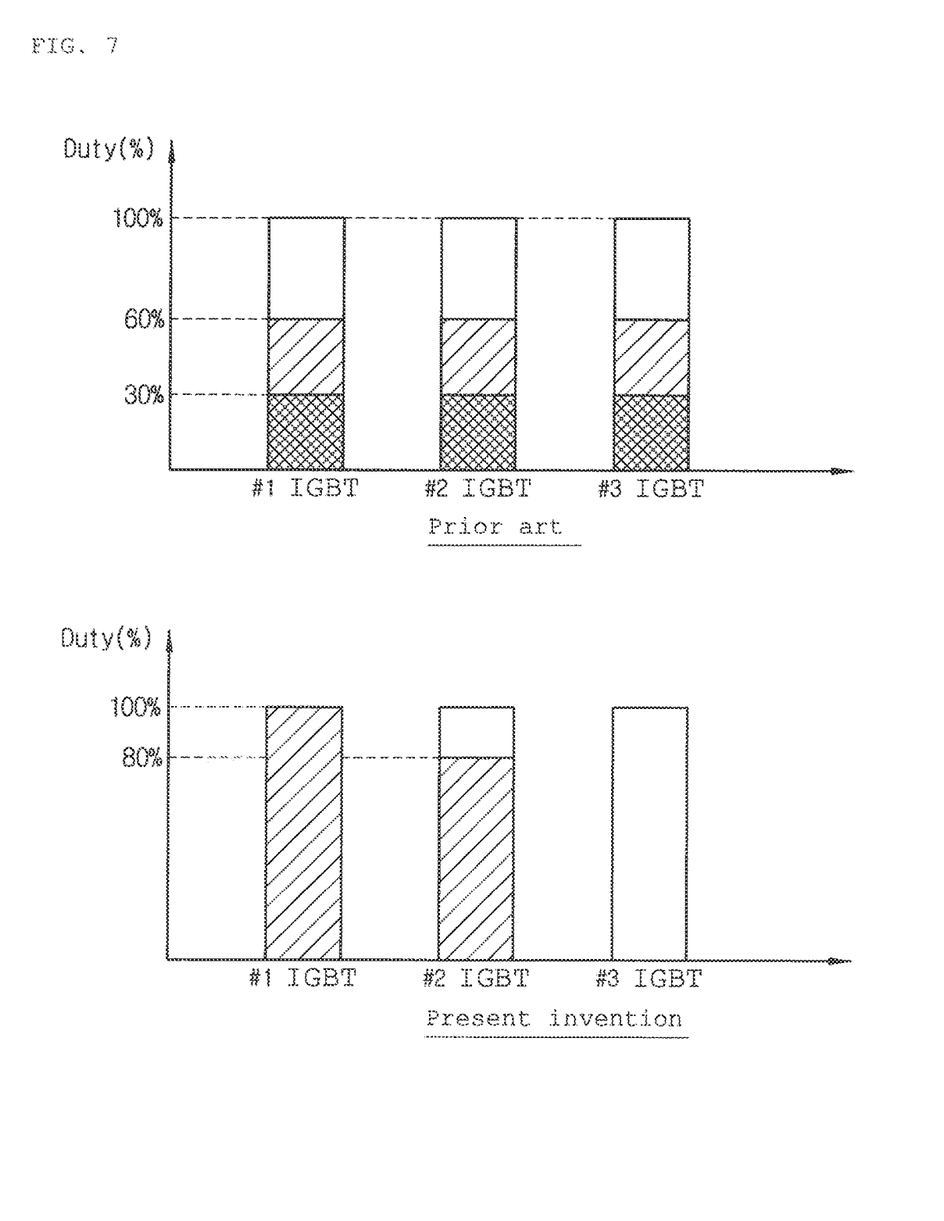
FIG. 7 is a graph showing the electric heater apparatus for the electric vehicle according to the present invention, which controls three IGBTs in serial order, and the heater apparatus according to the prior art, which controls three PGBTs at the same time.

FIG. 7 is a graph showing the electric heater apparatus for the electric vehicle according to the present invention, which controls three IGBTs in serial order, and the heater apparatus according to the prior art, which controls three PGBTs at the same time. As shown in FIG. 7, the conventional electric heater apparatus has the problem in that the control width at low temperature is reduced and power consumption is increased due to the frequent cycling when the three IGBTs are controlled at the same time according to the target heating temperature. However, in the electric heater apparatus according to the present invention, the minimum heat value is reduced to thereby increase a controllable section of the PTC heater 17 because the three IGBTs are controlled in serial order according to the target heating temperature, and hence, unnecessary cycling is reduced at a low temperature and unnecessary power consumption is also reduced.

In the meantime, FIG. 7 illustrates a state where the heat value needed according to the target heating temperature exceeds the heat value of one IGBT, and in this instance, one IGBT is operated in the full-on state and the other IGBT is in a duty control state.

The switching part 13 includes a plurality of the switching modules 13a to 13c in order to supply an electric current for outputting a set output load of the PTC heater 17. Each IGBT includes: a collector connected to the power supply part (not shown), an emitter connected to the PTC heater 17, and a gate terminal connected to the PTC micom 120.

In an embodiment of a heating part of the present invention, the PTC heater 17 is manufactured using a semiconductor element, which is made of barium titanate group or the like and has fixed temperature heating characteristics by varying resistance according to temperature. When electric power is applied, the PTC heater 17 carries out fixed temperature heating to keep a constant heat value because resistance is varied according to temperature. Such a PTC heater 17 are utilized in various fields as a stable heating element because electric resistance is increased to prevent electric current from flowing when electric current flows for a shorting period of time.

The power supply part is a high-voltage battery for operating the electric vehicle, and the PTC heater 17 is not an auxiliary heat source but a main heat source in the electric vehicle, and is operated by receiving electric power from the high-voltage battery, which directly operates the electric vehicle.

Figure 8:
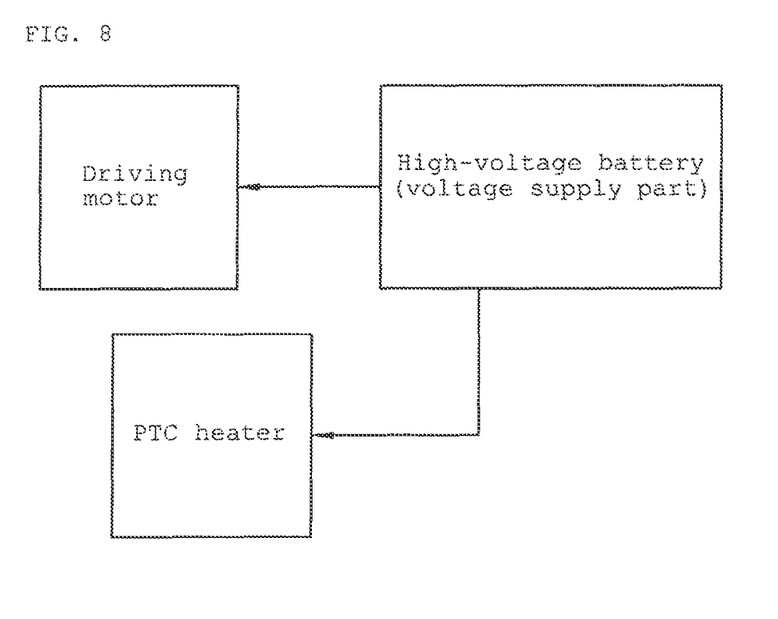

Referring to FIG, 8, the high-voltage battery, which is the power supply part, directly supplies electric power to a driving motor of the electric vehicle and the PTC heater 17.

Figure 9:
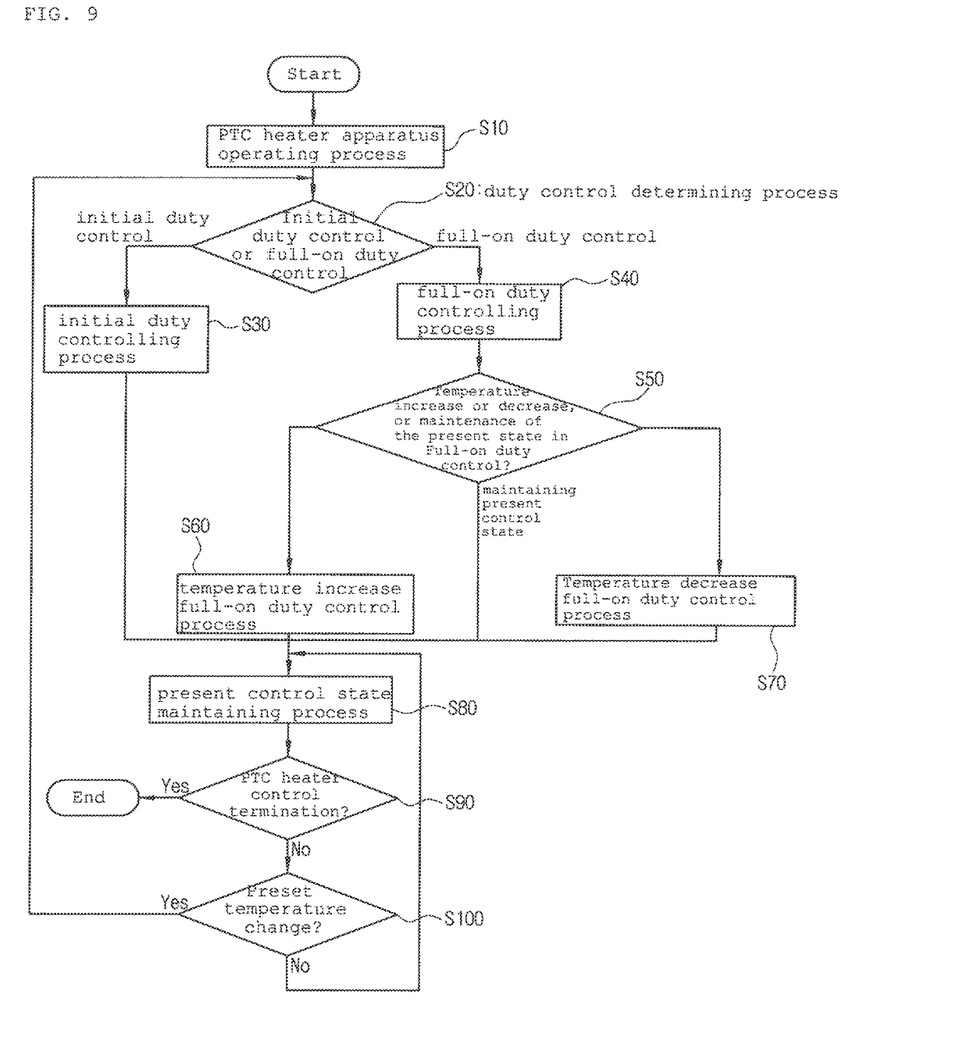
FIG. 9 is a process flow chart of a control method of the electric heater apparatus for the electric vehicle according to the present invention.

FIG. 9 is a process flow chart of a control method of the electric heater apparatus for the electric vehicle according to the present invention.

Referring to FIGS. 5 to 9, an operational process of the electric heater apparatus for the electric vehicle and the method of controlling the electric heater apparatus according to the present invention will be described.

When a user operates an air conditioner in order to heat the vehicle by operating the PTC heater apparatus 100 of the electric vehicle, the air-conditioner controlling part 11 outputs an operation command of the PTC heater 17 according to a preset temperature value so as to operate the PTC heater apparatus 100 (S10: PTC heater apparatus operating process).

The PTC micom 120 determines whether or not a current value supplied for the preset temperature by the operation command inputted from the air-conditioner controlling part 11 exceeds the maximum allowable current value of one IGBT. The PTC micom 120 carries out a duty control determining process (S20) of determining an initial duty control process (S30) when the current value does not exceed the maximum allowable current value and determining a full-on duty control process (S40) when the current value exceeds the maximum allowable current value.

As a result of determining the duty control determining process (S20), if the initial duty control process (S30) is determined, the initial duty control process (S30) of supplying electric power to the PTC heater 17 to generate heat by applying a PWM control signal to the gate terminal of the switching module (the first switching module of the switching modules 13a to 13c), which has one IGBT to carry out duty control in a section between Dmin to ⅓ in FIG. 6. Here, the initial duty control process (S30) means to carry out the duty control to one IGBT switching module.

On the contrary, as a result of determining the duty control determining process (S20), if the full-on duty control process (S40) that the current value exceeds the maximum allowable current value of the one IGBT switching module (one of the switching modules 13a to 13c), a current value supplied to the PTC heater 17 to generate heat to the preset temperature is calculated. After that, the switching modules 13a to 13c in number as many as the maximum allowable current capacity including the calculated current value are operated. After that, one switching module carries out duty control and the other switching modules 13a to 13c carry out the full-on duty control process (S40) to control the full-on state. Here, the full-on duty control process (S40) means a control process that one switching module carries out duty control and the other switching modules keeps the full-on duty control state after a plurality of IGBT switching modules 13a to 13c are operated.

The PTC micom 120 during the full-on duty control process (S40) determines whether or not a preset temperature change signal is inputted from the air-conditioner controlling part 11. If the preset temperature change signal is inputted, the PTC micom 120 determines whether the signal is an execute command of a temperature increase full-on duty control process (S60) or an execute command of a temperature decrease full-on duty control process (S70) and carries out the corresponding process. If the preset temperature change signal is not inputted, the PTC micom 120 determines maintenance of the present control state, and carries out a preset temperature change full-on duty control determining process (S50) to carry out a present control state maintaining process (S100) to maintain the present control state.

As a result of the preset temperature change full-on duty control determining process (S50), if the preset temperature is higher than the present state, the temperature increase full-on duty control process (S60) is carried out to increase a duty ratio of the switching module, which is carrying out the duty control, and then, the heat value of the PTC heater 17 is increased. In the above process, if the maximum value of electric current supplied to the PTC heater 17 exceeds the maximum allowable current value of the entire switching modules 13a to 13c, which are being operated now, the entire switching modules 13a to 13c, which are being operated now, carry out the full-on state control, and at the same time, one of the switching modules 13a to 13c is newly operated to carry out the temperature increase full-on duty control process (S60) for carrying out duty control.

On the contrary, as a result of the preset temperature change full-on duty control determining process (S50), if the preset. temperature is lower than the present state, the temperature decrease full-on duty control process (S70) is carried out to decrease the duty ratio of the switching module, which is carrying out the duty control, and then, the heat value of the PTC heater 17 is decreased. In the above process, if the maximum value of electric current supplied to the PTC heater 17 is lower than the maximum allowable current value of the switching modules, which are being operated now, excepting the one switching module, the switching modules 13a to 13c, which are being operated now, are turned off, After that, the temperature decrease full-on duty control process (S70) of carrying out duty control of one of the switching modules 13a to 13c, which carry out the full-on state control, to thereby decrease electric current supplied to the PTC heater 17 and reduce the temperature.

On the other side of the above, in the preset temperature change full-on duty control determining process (S50), if the preset temperature is not changed, a present control state maintaining process (S80) of maintaining the present duty control state is carried out.

Moreover, during the operation control process of the PTC heater apparatus 100, the initial duty control process (S30) progresses to the control state maintaining process (S80) of continuously maintaining the present control state. Furthermore, when temperature reaches the preset temperature, the temperature increase full-on duty control process (S60) or the temperature decrease full-on duty control process (S70) progresses to the present control state maintaining process (S80) of continuously maintaining the present control state.

During the present control state maintaining process (S80), the PTC micom 120 carries out a PTC heater control termination determining process (S90) of continuously determining whether or not there is a PTC heater control (operation) termination signal. In this process, when a PTC heater control termination command is inputted, the process is ended.

Differently from the above, if a PTC heater control termination command is not inputted, the PTC micom 120 carries out a preset temperature change command determining process (S100) of determining whether or not a preset temperature change command is inputted.

In the preset temperature change command determining process (S100), when the preset temperature change command is inputted, the process is returned to the duty control, determining process (S20) and the above processes are repeated. If the preset temperature change command is not inputted, the process moves to the present control state maintaining process (S80) and the above processes are repeated.

Through the PTC heater apparatus 100 and the PTC heater controlling method according to the present invention, as shown in FIG. 6, because the duty control section is divided and controlled in correspondence to the number of the switching modules 13a to 13c, the control temperature range in the control section of the electric power (N) of the PTC heater according to the present invention is expanded more than that of the electric power (0) of the PTC heater according to the prior art, and hence, the PTC heater according to the present invention has the minimum control temperature lower than the PTC heater according to the prior art.

When the minimum control temperature lowers, in the case that the PTC heater 17 is operated at low temperature, it can remarkably reduce the frequency of cycling, and hence, also reduce power consumption due to the frequent cycling.

The operation process of the PTC heater apparatus 100 or the processes of the method, of controlling the PTC heater are described in this specification in order to clarify the present invention. Accordingly, in the method of controlling the PTC heater according to the present invention, based on the technical characteristics that the initial duty control or the full-on duty control is carried out after the duty control section is divided, the processes from the full-on duty control process (S40) to the preset temperature change process (S100) may be changed by various changed processes, In the preferred embodiment of the present invention, three IGBTs are respectively controlled in three duty control sections to lower the inside temperature. That is, the IGBTs of the N-tuple are applied, the present invention can lower the minimum temperature to 1/N in comparison with the prior art, and it means that the inside heating of the electric vehicle can be controlled in such a way as to always have the minimum temperature by the minimum output of one IGBT even though the number of the IGBTs is increased.

Moreover, the PTC heater apparatus according to the present invention applied to the electric vehicle is described, but can be applied to all kinds of vehicles, such as hybrid cars, automobiles, and other vehicles.

What is claimed is:

1. An electric heater apparatus for an electric vehicle comprising:
   a power supply part;
   a switch control part configured to generate a switching control signal according to a control command of an air-conditioner controlling part;
   a switching part switched according to the switching control signal of the switch control part, the switching part configured to supply electric power of the power supply part to a PTC heater; and
   the PTC heater configured to receive the electric power of the switching part and to generate heat,
   wherein the switching part includes a plurality of switching modules set to control an output load of the PTC heater,
   wherein the switch control part is configured to operate the plurality of switching modules in a particular order according to a target heating temperature, the particular order consisting of a serial order,
   wherein the plurality of switching modules comprise IGBTs (Insulated Gate Bipolar mode Transistors) which are high-voltage switching elements, each IGBT with the same maximum allowable current capacity,
   wherein the switch control part divides a temperature control section of the heating part according to the number of the IGBTs,
   wherein the switch control part carries out a duty control of one IGBT in the case that temperature control is carried out by electric current which does not exceed the maximum allowable current capacity of one IGBT, and carries out the duty control of one IGBT and controls other IGBTs to maintain a full-on operation state in the case that the temperature control is carried out by electric current which is in an allowable current capacity range of two or more IGBTs, and
   wherein the switch control part turns off the IGBT which is in the duty control and carries out the duty control of one of the IGBTs which are in the full-on operation state so as to reduce the temperature, in the case that the IGBT which is in the duty control reaches the minimum duty control value of the IGBT during a temperature decrease control.

2. The electric heater apparatus according to claim 1, wherein the switch control part controls ON/OFF modes of the switching part by applying a PWM (Pulse Width Modulation) control signal to a gate terminal of the IGBT.

3. The electric heater apparatus according to claim 1, wherein the power supply part is a high-voltage battery.

* * * * *